US009614869B2

(12) United States Patent
Prieto Alvarez et al.

(10) Patent No.: US 9,614,869 B2
(45) Date of Patent: Apr. 4, 2017

(54) SYSTEM AND SERVER FOR DETECTING WEB PAGE CHANGES

(71) Applicants: Victor Manuel Prieto Alvarez, Culleredo (ES); Manuel Alvarez Diaz, A Coruña (ES); Fidel Cacheda Seijo, Oleiros (ES); Victor Carneiro Diaz, A Coruña (ES)

(72) Inventors: Victor Manuel Prieto Alvarez, Culleredo (ES); Manuel Alvarez Diaz, A Coruña (ES); Fidel Cacheda Seijo, Oleiros (ES); Victor Carneiro Diaz, A Coruña (ES)

(73) Assignee: Universidade da Coruña—OTRI, A Coruña (ES)

( * ) Notice: Subject to any disclaimer, the term of this patent is extended or adjusted under 35 U.S.C. 154(b) by 200 days.

(21) Appl. No.: 14/550,993

(22) Filed: Nov. 22, 2014

(65) Prior Publication Data

US 2015/0082438 A1 Mar. 19, 2015

Related U.S. Application Data

(60) Provisional application No. 61/908,063, filed on Nov. 23, 2013.

(51) Int. Cl.
*H04L 29/06* (2006.01)
*H04L 29/08* (2006.01)
*G06F 17/30* (2006.01)

(52) U.S. Cl.
CPC .... *H04L 63/1458* (2013.01); *G06F 17/30864* (2013.01); *H04L 63/145* (2013.01); *H04L 63/1483* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 5,978,842 A | * | 11/1999 | Noble | G06F 17/3089 707/999.01 |
| 7,356,482 B2 | * | 4/2008 | Frankland | C10G 65/04 705/7.12 |

(Continued)

FOREIGN PATENT DOCUMENTS

CA  2416182 A1 * 1/2002 ....... G06F 17/30864

*Primary Examiner* — Malcolm Cribbs
(74) *Attorney, Agent, or Firm* — Mateo Aboy; Aboy & Associates, PC

(57) ABSTRACT

Disclosed embodiments include a distributed system and server for detecting changes to web pages comprises (a) a Web Change Detection (WCD) server connected to the network, and (b) one or more WCD agents stored on the WCD server configured to be executed directly on a web browser to detect web page changes. The WCD comprises (a) an agent storage module configured to store the WCD agents, (b) a WCD repository to store a WCD information regarding the web pages in the server memory, and (c) a WCD changes detector configured for receiving information sent by the WCD agents and detecting changes on the web pages. The WCD system relies on the web users accessing sites to collaboratively detect the changes on the web pages, eliminating the need for crawler estimates of web-page changes.

4 Claims, 16 Drawing Sheets

(56) References Cited

U.S. PATENT DOCUMENTS

| | | | | |
|---|---|---|---|---|
| 7,542,958 B1* | 6/2009 | Warren | ............... | G06F 17/3089 |
| | | | | 706/48 |
| 8,732,837 B1* | 5/2014 | Miller | ................. | G06F 21/6218 |
| | | | | 709/223 |
| 8,868,541 B2* | 10/2014 | Lin | .................... | G06F 17/30864 |
| | | | | 707/709 |
| 9,390,422 B2* | 7/2016 | Toomey | ................. | G06Q 30/02 |
| 2001/0016873 A1* | 8/2001 | Ohkado | ................. | G06F 9/465 |
| | | | | 709/205 |
| 2001/0044820 A1* | 11/2001 | Scott | ................... | G06F 17/3089 |
| | | | | 709/202 |
| 2002/0156890 A1* | 10/2002 | Carlyle | ............ | G06F 17/30864 |
| | | | | 709/224 |
| 2005/0071766 A1* | 3/2005 | Brill | ................. | G06F 17/30864 |
| | | | | 715/738 |
| 2006/0004719 A1* | 1/2006 | Lawrence | .............. | G06Q 30/00 |
| 2006/0190561 A1* | 8/2006 | Conboy | ........... | G06F 17/30864 |
| | | | | 709/217 |
| 2006/0230055 A1* | 10/2006 | Marcjan | ........... | G06F 17/30899 |
| 2007/0050338 A1* | 3/2007 | Strohm | ............. | G06F 17/30864 |
| 2007/0239777 A1* | 10/2007 | Toomey | ............ | G06F 17/30867 |
| 2008/0114739 A1* | 5/2008 | Hayes | ............... | G06F 17/30864 |
| 2008/0244554 A1* | 10/2008 | Kadashevich | ........ | G06F 21/572 |
| | | | | 717/168 |
| 2011/0178868 A1* | 7/2011 | Garg | ................ | G06F 17/30864 |
| | | | | 705/14.45 |
| 2012/0173966 A1* | 7/2012 | Powell | ............... | G06F 17/2247 |
| | | | | 715/234 |
| 2013/0097702 A1* | 4/2013 | Alhamed | ............... | G06F 21/64 |
| | | | | 726/22 |
| 2014/0181631 A1* | 6/2014 | Lund | .................. | G06F 17/3089 |
| | | | | 715/234 |
| 2015/0082438 A1* | 3/2015 | Prieto Alvarez | ...... | H04L 63/145 |
| | | | | 726/23 |

* cited by examiner

|  | GOOGLE | WCD |
|---|---|---|
| OUTDATED TIME (%) | 61.13 | 0.00 |
| UNNECESSARY REFRESH | 3 | 0.00 |
| UNDETECTED CHANGES | 5 | 0.00 |

FIG.9

|        | PR 0  | PR 1  | PR 2  | LOW PR | PR 3  | PR 4  | PR 5  | HIGH PR |
|--------|-------|-------|-------|--------|-------|-------|-------|---------|
| GOOGLE | 38.15 | 45.69 | 38.73 | 40.75  | 26.64 | 15.75 | 28.99 | 23.79   |
| YAHOO! | 45.22 | 30.75 | 26.2  | 34.07  | 32.59 | 24.90 | 22.81 | 26.77   |
| BING   | 32.32 | 30.77 | 32.82 | 31.81  | 32.59 | 22.64 | 23.41 | 26.22   |
| WCD    | 0.22  | 0.15  | 0.25  | 0.21   | 0.04  | 0.02  | 0.04  | 0.03    |

FIG.16

SYSTEM AND SERVER FOR DETECTING WEB PAGE CHANGES

CROSS-REFERENCE TO RELATED APPLICATIONS

This application claims the priority benefit of U.S. Provisional Application No. 61/908,063 filed on Nov. 23, 2013 by the present inventors, which is incorporated herein by reference in their entirety.

TECHNICAL FIELD

Disclosed embodiments relate generally to web servers. Specifically, they relate to web page detection systems and change-detection servers.

BACKGROUND

The Web is the biggest information repository ever built. Currently, it consists of thousands of millions of pages and it is continuously growing. Due to its large size, it is indispensable to use search engines to access the information which is relevant to the user. Search engines are complex systems that allow several operations to be performed with the information, such as collecting, storing, managing, locating, and accessing it. Systems that perform the task of gathering data are the crawlers. The crawling systems or crawlers are the programs that traverse the web following URLs to obtain the documents to be later indexed by the search engines.

Search engines use crawlers to traverse the Web in order to download web pages and build their indexes. Maintaining these indexes up-to-date is an essential task to ensure the quality of search results. However, changes in web pages are unpredictable. Identifying the moment when a web page changes as soon as possible and with minimal computational cost is a major challenge.

Web crawlers are Internet bots that are programmed to traverse the whole web or a specific set of pages previously configured and store the web pages downloaded in a repository which is later indexed by the search engine. Once finished, the crawler must start over again to keep updated the web pages indexed. A challenge of this task is that not all the pages change at the same rate. Some pages are highly variable and the time spent between two consecutive crawls may be too high to keep the repository updated. To deal with this difficulty, crawling systems implement recrawling policies that decide when it is necessary to revisit and update the content of a web page indexed by the search engine. These recrawling policies are often based on the change history of each web page and its relevance.

The underlying problem in the recrawling process is to know when the content has changed. Ideally, a crawler would have to recrawl a page just after it has been modified. If it is accessed before if has changed, the visit is useless. However, the longer it takes the crawler to revisit a modified page, the information becomes more stale and probably less relevant to the end user.

Currently, most crawling systems try to guess, estimate, or predict when a web page has changed. There are some disclosures that present methods to maintain the repositories of search engines updated. For example, U.S. Pat. No. 8,078,974 proposes to detect web page changes with revisitation patterns. The patent proposes to analyze the change data to produce a change characterization, with the change data reflecting differences between the content of a web page at different times. The revisitation data is analyzed to produce a revisitation characterization, with the revisitation data including visit times to the web page by a user. A relationship is determined between the change and the revisitation data based on the change and the revisitation characterizations. Similarly, U.S. Pat. No. 7,310,632 describes a method based on a decision-theoretic component that determines an appropriate time to crawl a web page and makes predictions regarding the changes in a web page. The predictive analysis is based on a) the utility a web page, b) historical data, and c) content contained. These disclosure teach that this problem is solved by keeping the repositories updated by trying to estimate when the web resource may have changed. However, they are not able to detect when a web resource has actually changed.

There are some other approaches that use a distributed architecture, such as the one disclosed in U.S. Pat. No. 5,978,842. In this case, the user registers a web page that wants to be monitored in the server and must install a client-side change detection application. The server of the system assigns a date and time for the client to perform change detection. At the assigned time and date, the client fetches a new copy of the web page and compares it to an archived copy to detect changes. As more users are registered for a web page, change detection is performed more frequently by the users. This method requires the user to install a client-side change detection application and also requires extra access to the web page in order to detect if any change has occurred so that the user can be notified of changes in a specific web page.

SUMMARY

Disclosed embodiments include a distributed system for detecting changes to one or more web pages in a network which comprises: (a) a Web Change Detection (WCD) server connected to the network, and (b) one or more WCD agents stored on the WCD server configured to be executed directly on a web browser to detect web page changes. In a particular embodiment, the WCD comprises: (a) an agent storage module configured to store the WCD agents; (b) a WCD repository to store a WCD information regarding the web pages in the server memory; and (c) a WCD changes detector configured for receiving information sent by the WCD agents and detecting changes on the web pages. The WCD system relies on the web users accessing sites to collaboratively detect the changes on the web pages, eliminating the need for crawler estimates of web-page changes.

BRIEF DESCRIPTION OF THE DRAWINGS

Disclosed embodiments are illustrated by way of example, and not by way of limitation, in the figures of the accompanying drawings:

FIG. 9 shows the change detection measures for a particular embodiment in the best case scenario.

FIG. 16 shows the average change detection time for a particular embodiment in the worst case scenario.

DETAILED DESCRIPTION

Figure 1:
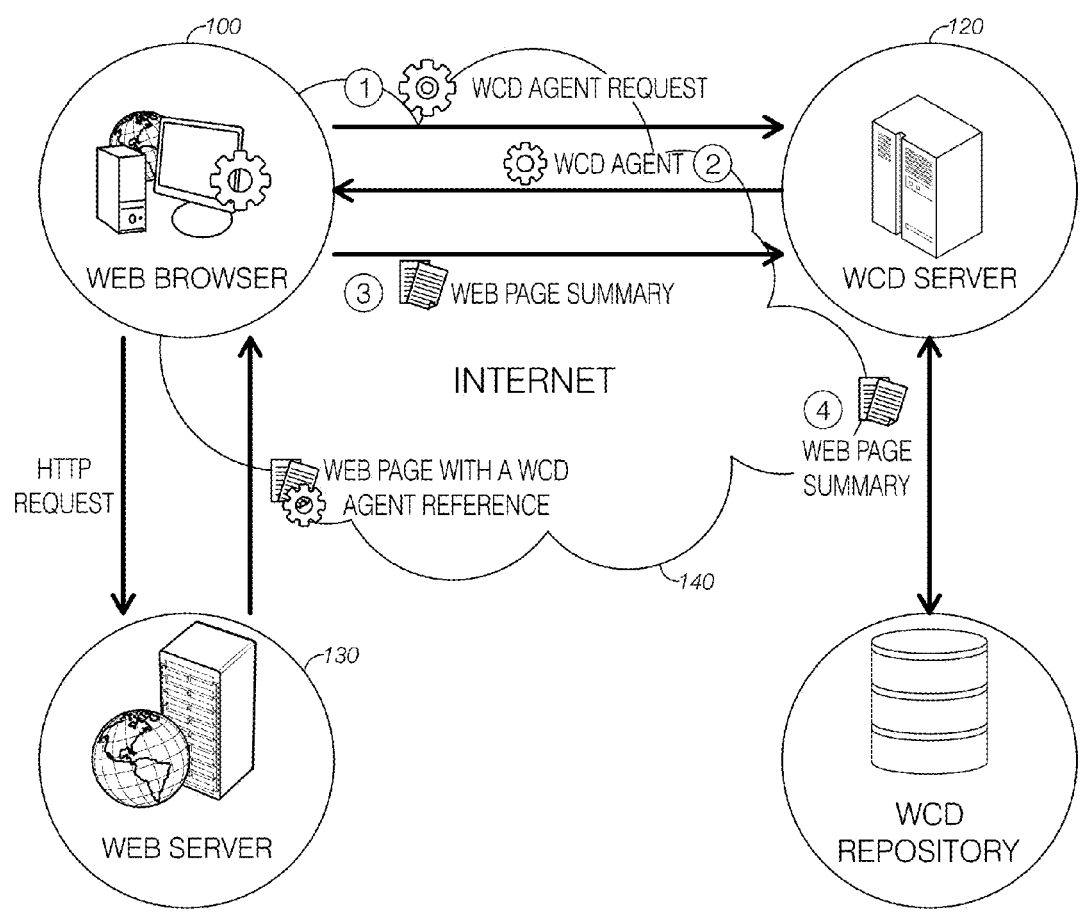
FIG. 1 shows a block diagram illustrating the components of an embodiment of a general WCD system.

A. General Description of System and Methods

Disclosed embodiments include a web change detection system. In a particular embodiment, the Web Change Detection (WCD) system is based on a distributed and collaborative architecture, using one or more web servers, one or more web browsers, a WCD server, and one or more WCD agents. According to one embodiment, as shown on FIG. 1, the web change detection system includes one or more web clients 100, one or more web servers 130, one WCD server 120, one or more WCD agents 110 and a network 140.

According to one embodiment, the distributed system for detecting changes to one or more web pages in a network, comprises (a) a Web Change Detection (WCD) server connected to the network, and (b) one or more WCD agents stored on the WCD server configured to be executed directly on a web browser to detect web page changes. In this embodiment, and without limitation, the WCD comprises: (a) an agent storage module configured to store one or more WCD agents; (b) a WCD repository to store a WCD information regarding the web pages in the server memory; and (c) a WCD changes detector configured for receiving information sent by the WCD agents and detecting changes on the web pages. Additionally, the WCD server is configured for receiving a WCD agent request from a web browser and submitting the WCD agent to the web browser. In this embodiment, the WCD server is further configured for receiving WCD information from the WCD agents, determining if the web page has changed and updating the WCD information stored on the WCD repository. The WCD agent is configured to be executed directly on a web browser and is further configured for calculating a summary of a web page as part of the WCD information of the web page and sending the WCD information to the WCD server.

According to one embodiment, the system is based on a Web client-server model, where the web browser makes a request to a web server and the web server sends the web page. The WCD system starts if the web page includes a reference to a WCD agent, which requires the web browser to request a WCD agent to the WCD server (FIG. 1, Step 1). The WCD server then processes the request and sends the appropriate WCD agent to the web browser (FIG. 1, Step 2). The WCD agent is executed in the web browser and summarizes the content of the web page. The WCD agent sends this summary to the WCD server (FIG. 1, Step 3), which compares this information with the information stored in the WCD repository and determines if the web page has been modified (FIG. 1, Step 4).

According to one embodiment, the method for detecting changes on one or more web pages, comprises: (a) implementing a Web Change Detection (WCD) server with one or more WCD agents stored on the WCD server; and (a) executing the WCD agent by a web browser to generate WCD information for a web page. The agent manager on the WCD server sends the WCD agent to the web browser depending on one or more local parameters and one or more remote parameters, and WCD changes detector retrieves WCD information stored on the WCD repository and compares the WCD information stored on the WCD repository with the WCD information from the WCD agent to determine if the web page has changed.

According to a specific embodiment, the method for detecting changes on one or more web pages, comprises: (a) implementing a Web Change Detection (WCD) server with one or more WCD agents stored on the WCD server; (b) selecting and sending a corresponding WCD agent based on an information page received; (c) executing the one or more WCD agents by a web browser to generate WCD information for a web page and sending it to the WCD server; (d) comparing the WCD information against information stored in the WCD server; and (e) detecting whether the page has been modified.

A.1. Web Change Detection Server

Figure 2:
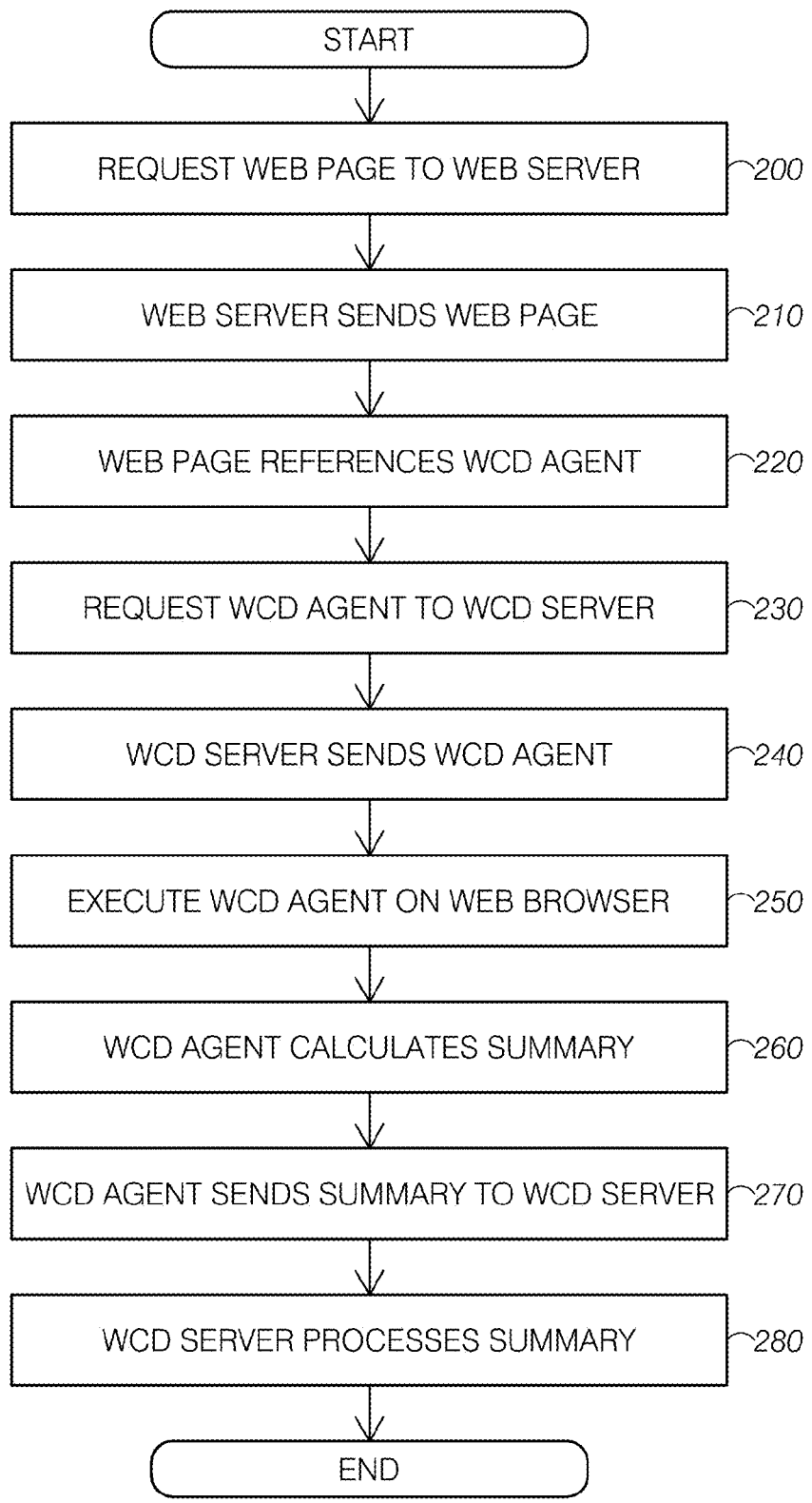
FIG. 2 shows an embodiment for the WCD protocol and system.

According to one embodiment, the distributed computer-implemented web change detection system for detecting changes on web pages stored web servers is based on the following general steps, as shown on FIG. 2: 1) the user requests a web page using a web browser to a web server 200, 2) the web server sends the web page to the web browser 210, 3) the web page includes a reference to the WCD agent 220, 4) the web browser requests the WCD agent to the WCD server 230, 5) the WCD server sends the WCD agent to the web browser 240, 6) the web browser executes the WCD agent 250, 7) the WCD agent generates a summary of the web page 260, 8) the WCD agent sends to WCD server the summary 270, and 9) the WCD server processes the summary 280.

Figure 3:
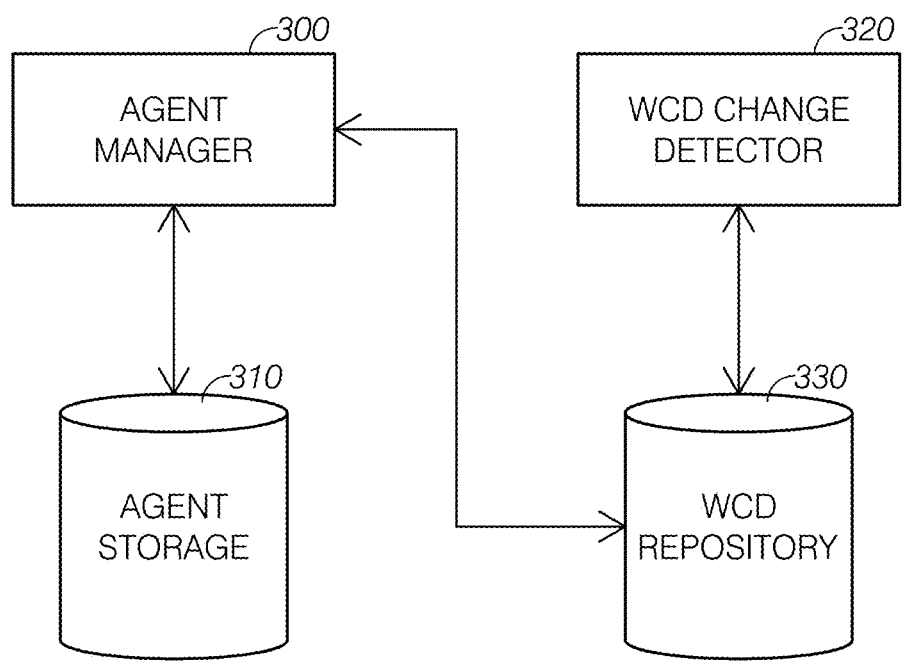
FIG. 3 shows a block diagram representing an embodiment of the WCD Server.

According to one embodiment, as shown on FIG. 3, the WCD Server is composed of two subsystems: the Agent Manager 300 and the WCD Changes Detector 320. The Agent Manager handles the WCD Agents using the Agent Storage 310 and the WCD Changes Detector updates the web page information on the WCD Repository 330. The WCD Repository stores all the information about the monitorized web pages. The following information can be stored for each web page: 1) Last web page summary, which is computed by the WCD Agent, 2) last modification date, 3) last access date, 4) change rate: defined as the number of detected changes per time unit (e.g. hours), 5) importance of the page: for example, the PageRank.

Figure 4:
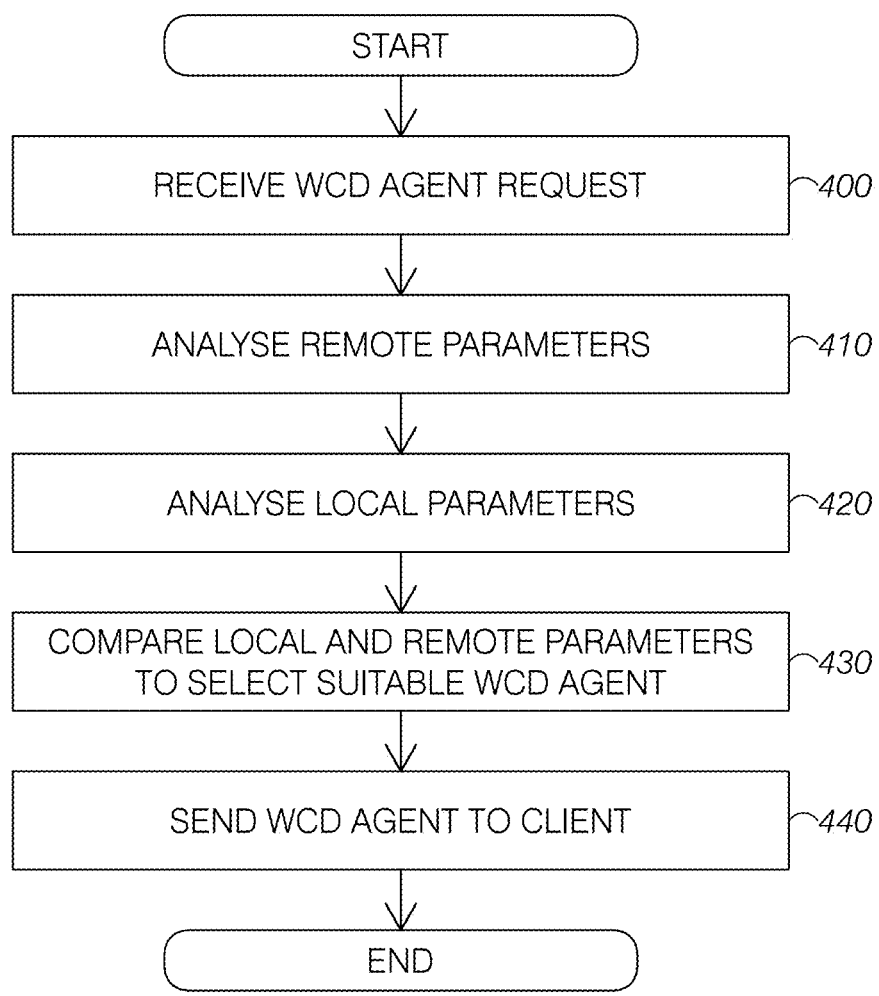
FIG. 4 shows an embodiment for the Agent Manager of the WCD Server.

According to another embodiment, as shown on FIG. 4, the Agent Manager receives the agent requests sent by the web browsers 400, analyzes the remote parameters, such as the web browser version or the operating system type 410, analyses the local parameters, such as the time spent since the last update 420, decides which WCD agent to send based on the local and remote parameters analysis 430 and send the WCD Agent to the client's web browser 440.

Figure 5:
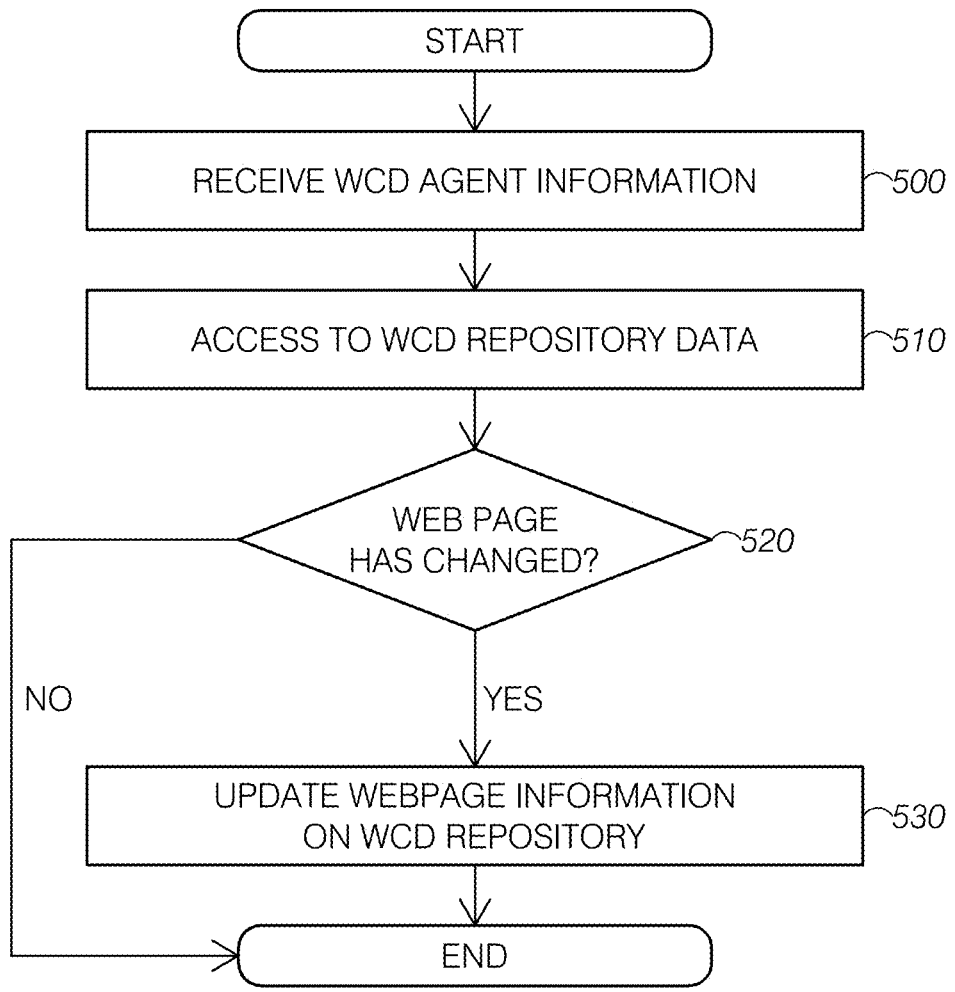
FIG. 5 shows an embodiment for the WCD Change Detector of the WCD Server.

According to another embodiment, as shown on FIG. 5, the WCD Changes Detector receives the web page information sent by the WCD Agents 500, accesses the web page information stored on the WCD Repository 510, and checks if the web page has changed by comparing the summary received from the WCD Agent with the summary stored on the WCD repository 520. If the web page has changed it updates the web page information (e.g. the last modification date and the summary) stored on the WCD Repository 530.

A2. Web Change Detection Agent

Figure 6:
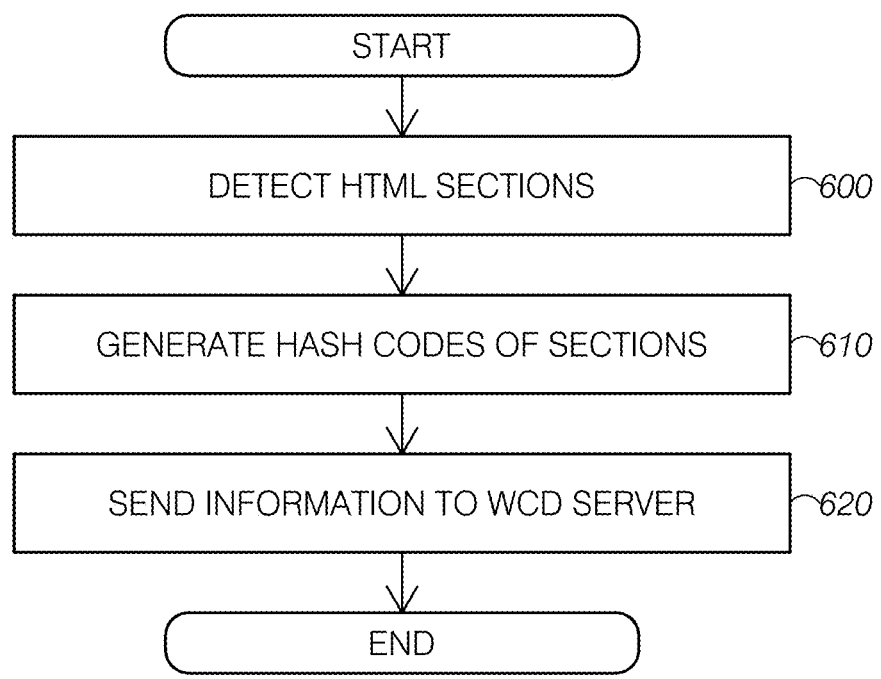
FIG. 6 shows an embodiment for the WCD Agent protocol and system.

According to one embodiment, as shown on FIG. 6, the WCD Agent is a computer-executable instruction set (application) that is downloaded from the WCD server to be executed on the web browser client. The WCD Agent detects the HTML sections of a web page 600, calculates a hash code for each section 610 (which is referred as the web page summary), and sends the information about the web page to the WCD server 620. The information submitted to the WCD server may include: the sections hash codes, the URL of the web page and the date and time of the access. Multiple types of WCD Agents can be operated by the WCD system including a Web Digester Agent and a Void Agent. The Web Digester Agent extracts the useful content of the following parts of the web page: title, header, body and footer. Then, the Agent calculates the MD5 hash code for each part (which constitutes the summary) and send to the WCD Server the summary, the URL, and the current date and time. The Void Agent does not compute any summary on the client browser and, therefore, does not send any notification to the WCD Server. This agent is particularly useful when the WCD server considers that the web page information is updated, for example, if the last access has been just a few seconds ago.

Using the disclosed WCD system in a search engine results in the following advantages:

Fast changes detection: the WCD system is able to detect in a few minutes when a web page has changed versus current search engines that guess when a web page may have changed based on statistical information.

Distributed processing: part of the processing to decide whether the web page has been modified, that is the "summary" of the web page, is done on the client side, which frees up the search engine, saving valuable resources.

Low maintenance: from the point of view of the content creator, a reference to the WCD agent must be inserted only once. It does not require access to the root directory nor prior knowledge of the frequency of changes to web pages such as those that must be specified in "robots.txt" and "sitemap.xml" files, and more importantly, the user does not depend on the implementation of the Last-Modified header in the web server.

B. System Description According to One Embodiment

The following description includes details of a particular embodiment implemented for the purposes of performance testing and evaluation with respect to other systems. The results of the experiments are described in Section C below.

B.1. Overall System Architecture

Figure 7:
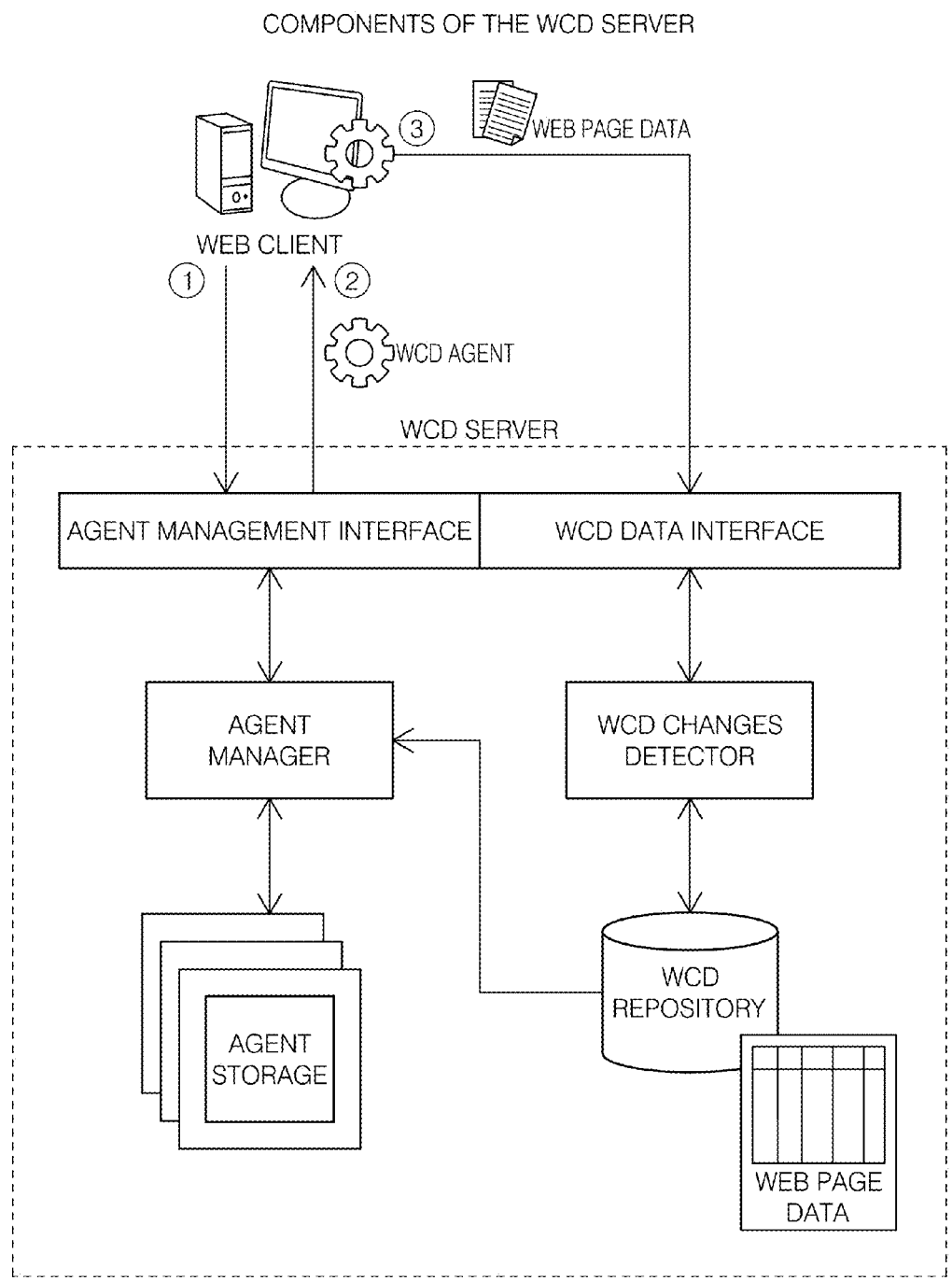
FIG. 7 shows a block diagram with the components of the WCD Server according to one embodiment.
Figure 8:
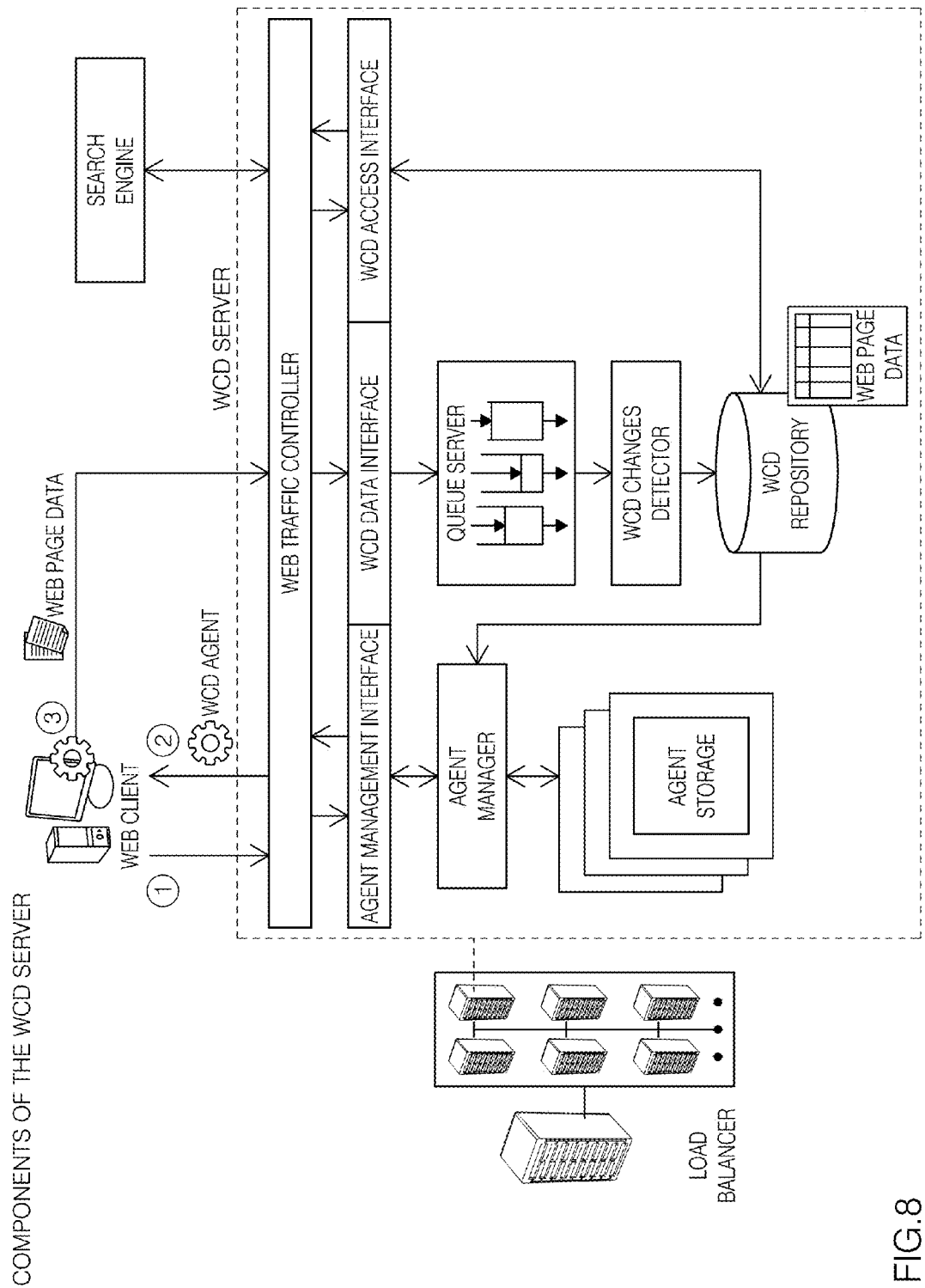
FIG. 8 shows a block diagram with the overall architecture of the WCD Server according to one embodiment.
Figure 10:
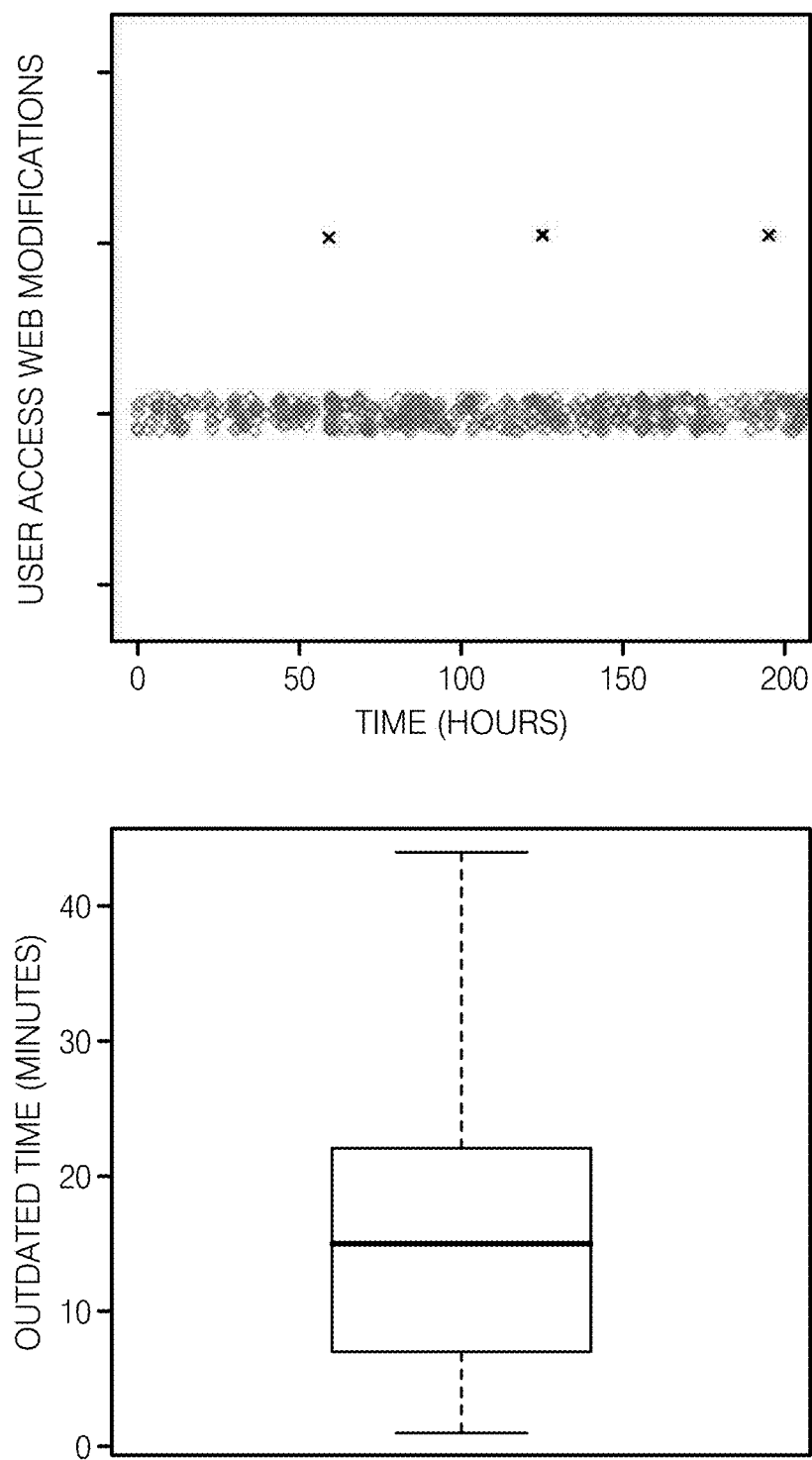
FIG. 10 shows the user accesses, web page modifications and time required to detect the changes by the WCD system for a particular embodiment on sites with PageRank 0.
Figure 11:
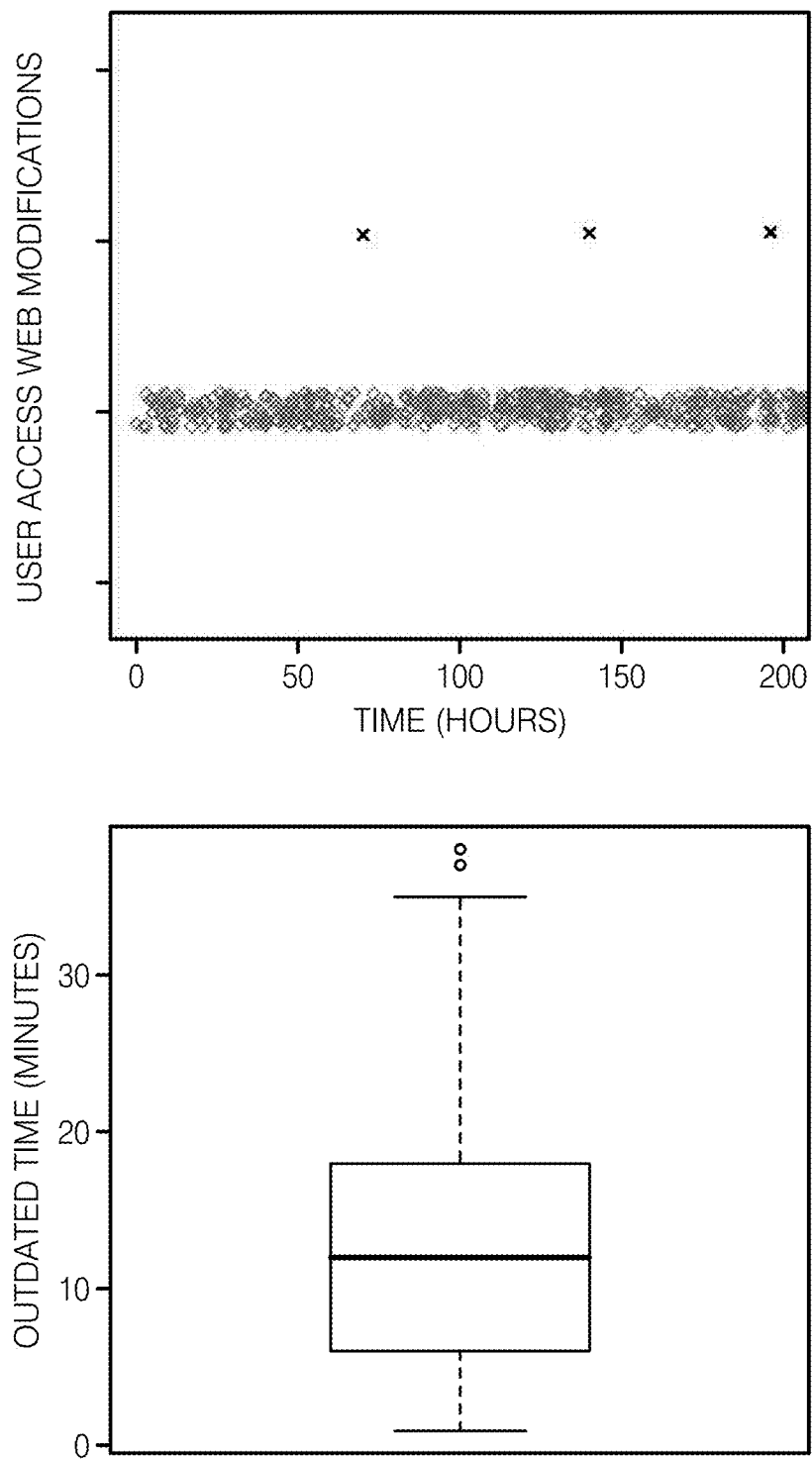
FIG. 11 shows the user accesses, web page modifications and time required to detect the changes by the WCD system for a particular embodiment on sites with PageRank 1.
Figure 12:
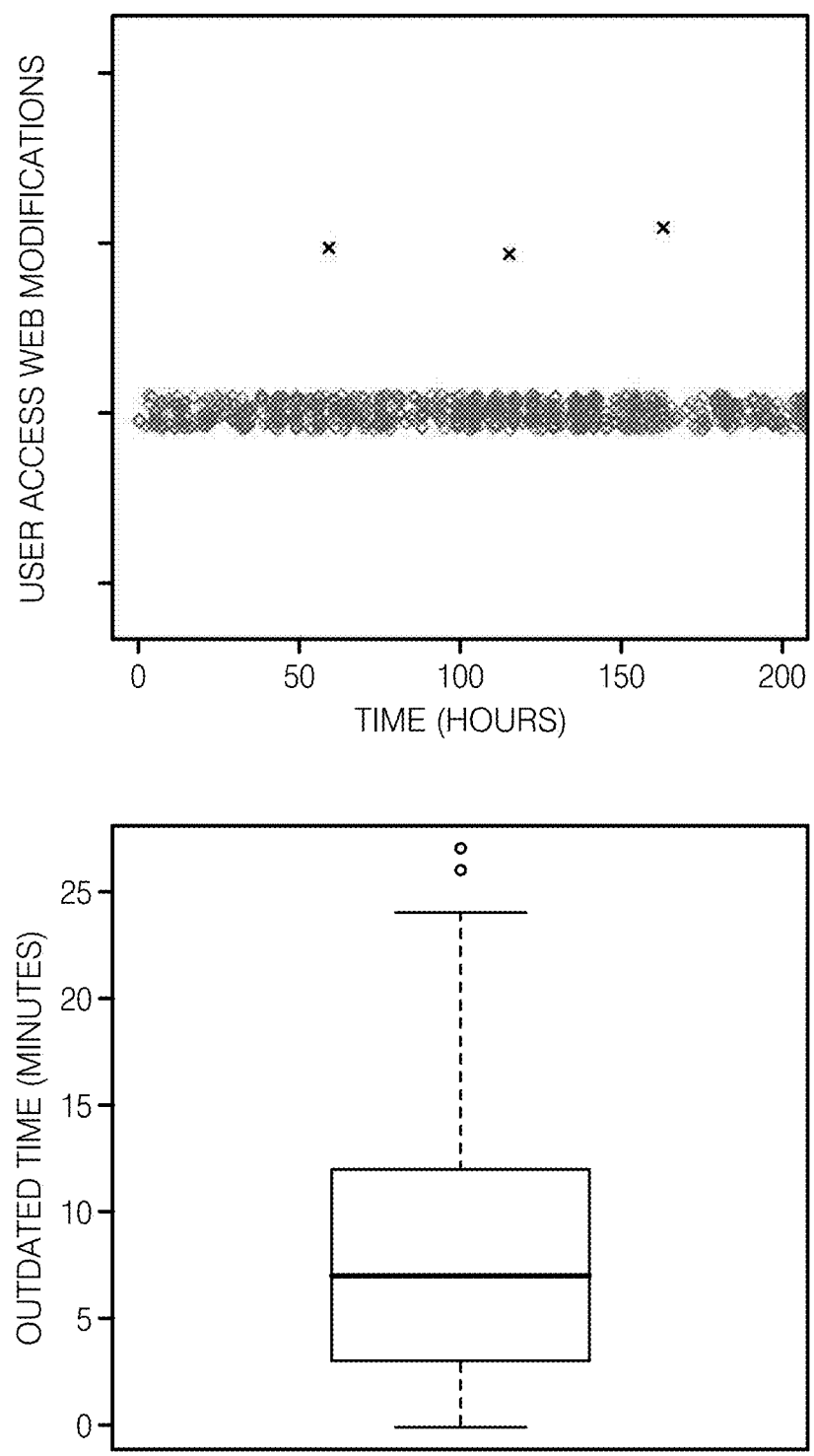
FIG. 12 shows the user accesses, web page modifications and time required to detect the changes by the WCD system for a particular embodiment on sites with PageRank 2.
Figure 13:
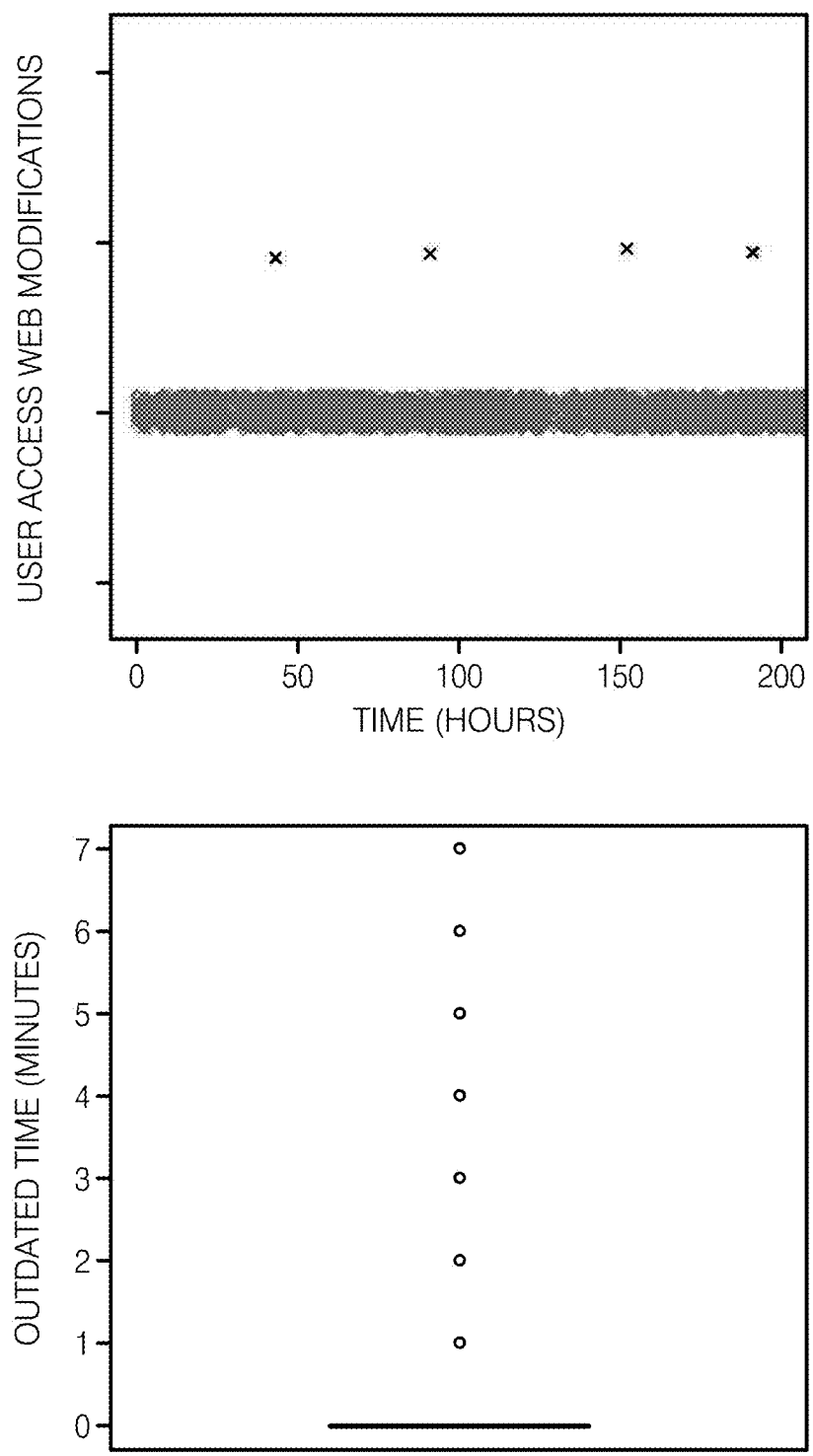
FIG. 13 shows the user accesses, web page modifications and time required to detect the changes by the WCD system for a particular embodiment on sites with PageRank 3.
Figure 14:
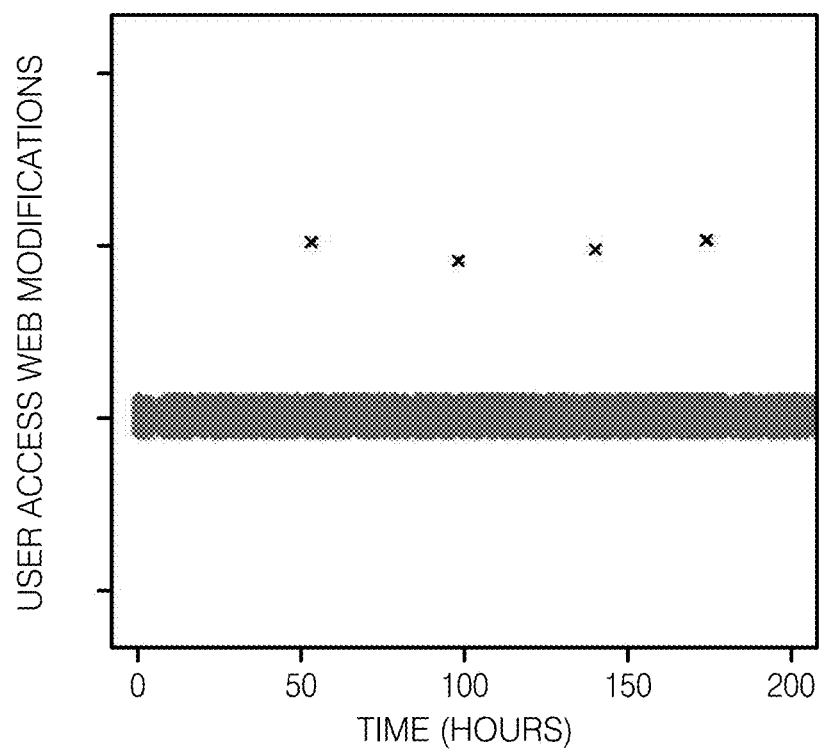
FIG. 14 shows the user accesses, web page modifications and time required to detect the changes by the WCD system for a particular embodiment on sites with PageRank 4.
Figure 14:
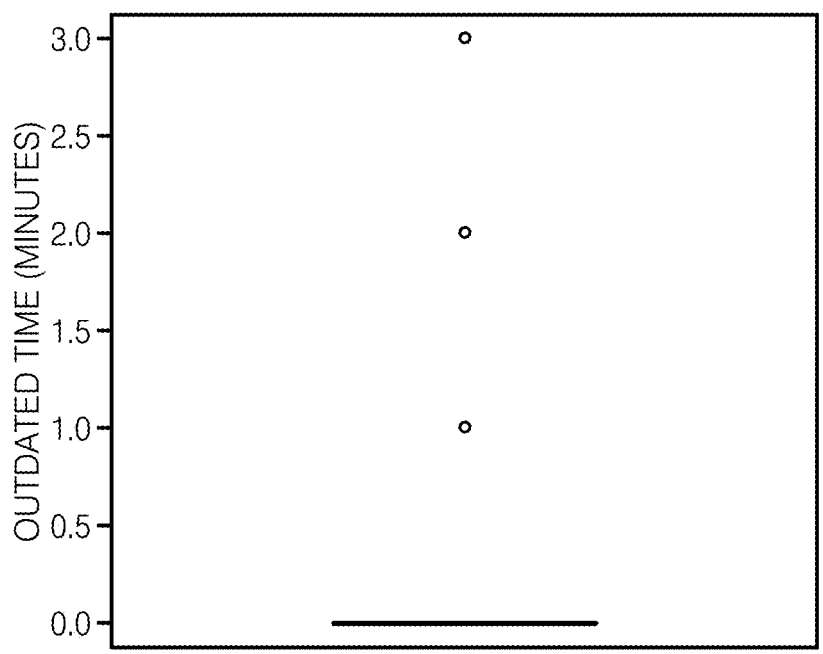
Figure 15:
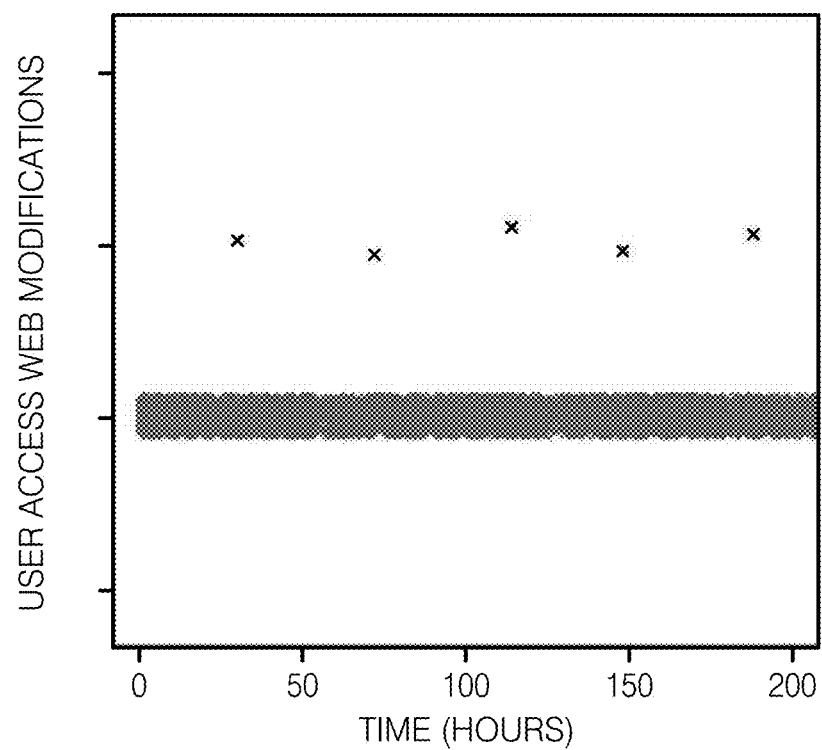
FIG. 15 shows the user accesses, web page modifications and time required to detect the changes by the WCD system for a particular embodiment on sites with PageRank 5.
Figure 15:
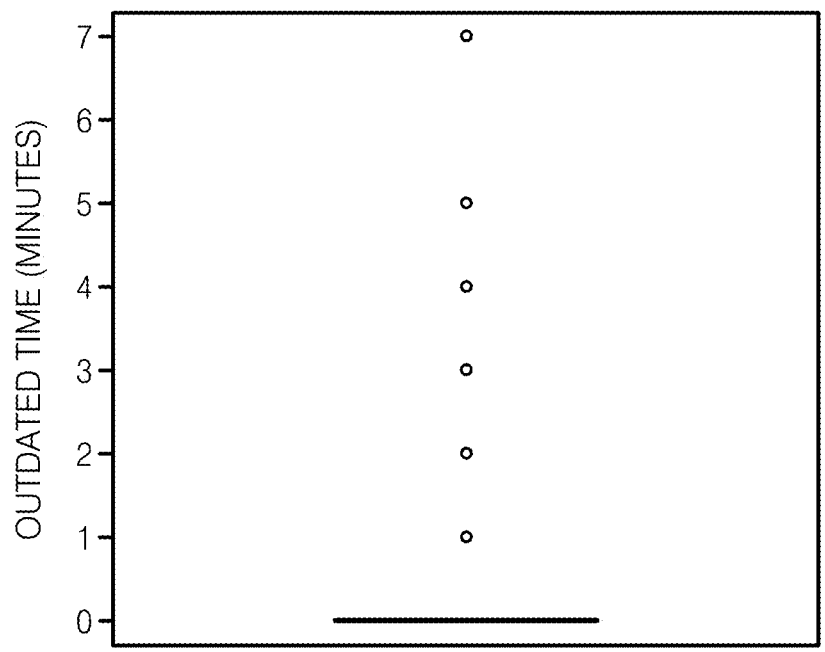

The WCD system, as shown in FIG. 7 and FIG. 8, is based on the distributed architecture of the World Wide Web (WWW) and incorporates a WCD server and a WCD agent to create a collaborative architecture in order to detect web pages changes. These are the main components of the WCD system architecture: Web Client, Web Server, WCD Agent, WCD server. In this implementation, and without limitation, the web client is a common web browser and it is responsible for loading the web page, requesting to the WCD server the WCD agent and executing it. The web server is a web server that stores one or more monitored web pages. Each monitored web page includes a reference to the WCD agent. As usual, when a web client requests a web page, the server sends its content to the browser. The WCD agent is a browser-based application that sends information about the web page modifications to the WCD server. The WCD server has two main tasks. On one hand, it stores and sends the WCD agents to the web clients. On the other hand, it stores and updates the data about all the monitored web pages. The WCD system uses a push model, that is, the WCD Agent notifies changes in web pages to the WCD server just when the web pages are visited.

B.2. WCD Server Embodiment

According to this particular embodiment, and without limitation, the WCD server is composed of two subsystems (as shown in FIG. 7):

The Agent Manager: it handles the WCD agents (using the Agent Storage), it receives the agent requests sent by the web browsers and decides (based on different parameters) which WCD agent to send.

The WCD Changes Detector: it is responsible for receiving the web page information sent by the WCD agents and detecting the modifications, updating the web page information (e.g. the last modification date) on the WCD Repository.

The WCD Repository stores all the information about the monitored web pages. The server provides two interfaces: the Agent Management Interface, that receives the WCD agent requests sent by the web browsers, and the WCD Data Interface, that receives the web page information submitted by the WCD agents.

The requests received by the Agent Management Interface are processed by the Agent Manager. The Agent Manager uses the information stored in the WCD Repository (e.g. the last access date) and some information about the client (e.g. browser type and version) to decide which agent should be sent in each case.

The information received through the WCD Data Interface is processed by the WCD Changes Detector. This module compares the web page summary submitted by the agent with the one stored in the repository in order to detect if any change has been produced. The information in the repository is be updated: the last access date and the remaining fields if any change has occurred.

B.2. WCD Agent Embodiment

According to this particular embodiment, the WCD agent is a JavaScript application that is downloaded from the WCD server to be executed on the web browser client. It creates a summary of the web page and it sends the web page information back to the WCD server for monitoring purposes. In this particular embodiment, and without limitation, two different WCD agents were implemented, the Web Digester Agent and the Void Agent, although the architecture is designed to operate with any number of WCD agents.

The Web Digester Agent computes the summary of the page by calculating the MD5 hash on its useful content. The useful content refers to its main content, where the information is really placed, without HTML tags, links, images or other similar formatting information to the WCD server. The agent calculates the MD5 hash for each part to create the web page summary and sends the summary, the URL, and the current date. The WCD agent sends the web page data to the WCD server through an AJAX request. This approach has the benefit that web users do not observe delays and their experience in the corresponding web page is not affected.

The Void Agent does not compute any summary on the client browser and, therefore, does not send any notification to the WCD server. This agent is useful when the WCD server considers that the web page information is updated, for example, if the last access has been just a few seconds ago. The WCD server can send the corresponding WCD agent depending on a number of factors: local (as time spent from the last update) or remote (as the version of the web browser).

B.3. WCD Operation and WCD Integration

The WCD system does not require any changes, add-ons or extensions to the web server nor the web client. Its operation is based on the WCD agent and WCD Server. From the webmaster point of view, the operation with the WCD system is seamless. Once a webmaster decides to include a web page in the WCD system, he must insert a reference to the WCD agent in the web page. In practice, this can be accomplished with JavaScript code to invoke the agent. Once this is done, the common scenario of the WCD system is as follows:

1. First, the user makes a request from the web browser to the corresponding web server. The web server responds by sending the content of the web page, which includes the reference to the WCD agent.
2. Then the web browser requests the WCD agent to the WCD server, to complete the web page content. The Agent Manager queries the repository for the last update time for the web page. Depending on the time spent since the last update, the Agent Manager sends a Web digester Agent or a Void Agent.
3. Finally, the web browser executes the WCD agent. If the Web Digester Agent was sent to the client, it generates the summary of the web page and send it back to the WCD server. Then, the WCD Changes Detector compares the page data with the data stored in the WCD repository, and updates it if necessary.

Current search engines use a crawler to continuously traverse the Web looking for new web pages and changes on the web pages already indexed. The crawler uses multiple crawling processes to improve performance and can perform different types of traversals of the Web. Some of them visit the Web periodically (i.e., re-starting the traversal when it is already completed). Another group conducts crawling of certain pages or web sites, based on recrawling policies including: a) the page relevance, b) the frequency of updates of each page and web site, and c) the type of website (newspapers, business pages, blogs, opinion pages, etc.). In order to detect web page changes, current search engines follow a pull method. Based on several statistical data (i.e. relevance or changes rating in the past), the search engine guesses that the web page has probably changed and therefore a recrawling is needed. A search engine with its WCD system integrated is be able to know that a web page has actually changed and then decide if it is worth recrawling.

The integration of the WCD system in a search engine architecture is done through the WCD Access Interface. This interface provides management and access operations to the information contained in the WCD Repository to the search engine and vice versa, and the WCD system can notify the search engine about web page changes.

In this embodiment, the communication between the search engine and the WCD system can work in three different modes: pull, push or a combination of both, according to the needs of the corresponding search engine. In the pull mode, the search engine queries to the WCD system for the web pages modified. In the push mode, the WCD system notifies the search engine about which web pages have been modified. As both modes are complementary, they can also be combined.

In order to use the WCD system in a search engine, certain considerations must be taken into account regarding security and scalability. In some situations, a user could modify the data sent to the system by the web browser agent to notify that the page has changed when in fact it has not. For managing these situations, the WCD system uses a module called Web Traffic Controller. This module is responsible for allowing or disallowing the access to the WCD system. In order to do this, the Web Traffic Controller maintains an index with the IPs and URLs that have to be filtered due to security issues. This data is stored in the WCD Repository. When the crawler reprocesses the page, it will check if the page has really changed. If the modification has not occurred, the crawler will notify the WCD system through the WCD Management Interface, so the WCD Traffic Controller can store the IP from which the manipulation has been performed, to filter the next notifications sent from this IP. The Web Traffic Controller also maintains a list of recent accesses for detecting DDoS attacks (Distributed Denial of Service) and filtering IPs from the generated blacklist.

Regarding scalability issues, the system must be resistant to sporadic load peaks caused by heavy use of the system, or by DDoS attacks. To deal with these situations, when the system detects an excessive rise in the load, the system follows the protocol described below:

WCD Management Interface: in this scenario, the system returns the Digester Agent avoiding querying the WCD repository. This is to avoid losing any notification of changes in pages and to avoid accessing the database to check when the web page was last modified. In the event that the system continues to increase its load, it sends the Void Agent. Thus, although it cannot detect a modification in a web page, the web browser will not send a data request to the WCD system.

WCD Data Interface: this interface receives information of the modifications performed in a web page and sends this to the WCD Changes Detector by means of the Queue Server. The Queue Server is responsible for storing this information in the corresponding queue for further processing. During load peaks the system can return a success code to the client almost instantaneously and perform the processing of the data when the system load decreases. Then, the system cleans the remaining contents of queues, only analyzing the most recent data for each page. After this, the system begins to process the data of the queues and updates the information stored in the WCD Repository.

Apart from the elements discussed above, and due to the high number of requests that the WCD system receives, the system is implemented using a distributed architecture. In this embodiment, it incorporates a Load Balancer, which is responsible for routing each new request to the process with the least load.

While particular embodiments have been described, it is understood that, after learning the teachings contained in this disclosure, modifications and generalizations will be apparent to those skilled in the art without departing from the spirit of the disclosed embodiments. It is noted that the disclosed embodiments and examples have been provided merely for the purpose of explanation and are in no way to be construed as limiting. While the system has been described with reference to various embodiments, it is understood that the words which have been used herein are words of description and illustration, rather than words of limitation. Further, although the system has been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in its aspects.

C. Experimental and Performance Results

According to one particular embodiment, the WCD system and method were evaluated to measure their ability to detect web page changes and the results obtained were compared with the main search engines. In order to perform the experiments, the prototype of the WCD system describe above was implemented. Two different scenarios are considered: a best case scenario and a worst case scenario.

C.1 Best Case Scenario

One of the assumptions behind the WCD system operation is that, after a webmaster modifies a web page, he will immediately load the web page to check that it is correctly displayed. This constitutes the best case scenario.

In order to test this best case scenario, we created a testing website (i.e. a blog at Blogspot: http://webchangedetector.blogspot.com.es/). For 30 days (from May 11 to Jun. 11, 2012) we added a post every 12 hours (i.e. every 12 hours the content of the site was changed). The objective of this experiment was to compare when the crawlers of the main search engines (Google, Yahoo! and Bing) detected the changes versus the WCD system.

The results obtained by Google and the WCD system are shown on FIG. 9. Three parameters are considered: 1) Outdated time: refers to the percentage of time a web page has changed, but the search engine has not detected the change. 2) Unnecessary refresh: counts the number of visits performed by the crawler when the web page has not changed. 3) Undetected changes: counts the number of times a web page has changed between two consecutive search engine accesses.

In the case of Google, the results show that our web site was outdate 61.13% of the time on the search engine index, that our blog was visited unnecessarily 3 times and 5 changes were missed. Regarding the WCD system, all the changes were detected in real time, without missing any change and without unnecessary visits to the web page. After each new post, the blog administrator loaded the web page (with the WCD agent) and the WCD agent reported the modification to the system.

C.1 Worst Case Scenario

In this section we explore the behavior of the WCD system in a worst case scenario. In this case, we assume that changes will occur, but the webmaster will not load the page to check the changes. Therefore, we depend only on the web users that will visit the page. The objective is to measure when the changes are detected and compare the results obtained with the main search engines.

Ideally, to test this scenario, we would need a sample of web pages with different PageRanks, that were monitored by the WCD system and indexed by the main search engines. At the same time, we would need to log every user access and every change in each web page.

The baseline was constituted by 150 web sites randomly selected from SeeTheStats (http://www.seethestats.com/). This web site provides the URL for web domains that are willing to share some information about user accesses from Google Analytics. For each web domain, only the home page was considered in these experiments. In order not to bias the experiment, two different types of web sites were considered: web pages with low PageRank (between 0 and 2), and web pages with high PageRank (between 3 and 5). Twenty-five sites for each PageRank were randomly selected. Web sites with higher PageRank are not considered because none was randomly extracted in our dataset (in fact, web sites with PageRank higher than 5 are not available on the web site). This distinction was made because we considered that the relevance of a web page (i.e. its PageRank) could be one of the factors used in the recrawling policy by search engines (i.e. more important pages will be tried to be kept more updated).

To determine when a search engine detects a change, we have obtained the cached version of each web page from the three search engines. More specifically, the cache date provided us with the information of the last access to the web page. Each web page was monitored during 30 days (from Apr. 30 to May 30, 2012). Due to search engine limitations, each web page could be only monitored every 12 hours.

At the same time, to detect when a web page changed, each page was being monitored using our own crawling system, every 12 hours for the same period of time. Small or minimum changes in a web page are discarded and only significant changes are considered. This will benefit search engines as they are required to detect only significant changes.

To simulate the behavior of the WCD system we need two main variables: web page changes and web page user accesses. Regarding the former, we have studied the time elapse between two consecutive changes on each of the 150 monitored web pages. The hypothesis was that changes should follow a Poisson distribution. A Kolmogorov-Smirnov one sample test was done for each page and the results conclude that for every one of the 150 tests, it would fit a Poisson distribution with a p-value below 0.005. The mean for the Poisson distribution is estimated from the average change rate obtained for each PageRank. The latter is also simulated using a Poisson distribution, following the works found in the state of the art that show that user accesses follow a Poisson distribution, under different circumstances.

To calculate the average user accesses per day, we extracted the statistics from the web site SeeTheStats for each monitored web site (in fact, this was the main reason to randomly select the web sites from SeeTheStats). These values were used as an estimation of the mean for each Poisson distribution. Using both stochastic variables (user accesses and page modifications) we simulated the behavior of the WCD system for different web pages with PageRank ranging from 0 to 5, during 200 hours (approximately one week). In each case, five different simulations were performed and the results showed correspond to the average values.

FIGS. 10, 11, 12, 13, 14 and 15 show the results for the web sites with PageRank 0, 1, 2, 3, 4 and 5, respectively. Each figure contains, 1) the user accesses according to a particular PageRank (squares) and the web page modifications (crosses), and 2) the box and whisker plot for the time required by the WCD system to detect a web page modification, according to the simulation performed. For example, on PageRank 0 the WCD system will need 15.08 minutes on average to detect a change, meanwhile on PageRank 5 this time is below the minute. The maximum time to detect a change in web page with PageRank 0 is 45 minutes, while on PageRank 5 it is only 7 minutes. In fact, the slowest time to detect a change was produced on a page with PageRank 0. that took 37 minutes.

In order to compare the results obtained by the WCD system with the search engines studied, we calculated the time that each search engine needed to detect a web modification. These results are shown on FIG. 16 (time units are hours). Analyzing the results on web pages with low PageRank, the search engines will take, on average, one day and a quarter (Google even more than one day and a half), to detect a modification. However, the WCD system will need, on average, only 12 minutes. This is two orders of magnitude smaller.

The results for the web pages with higher PageRank show that Google, Yahoo! and Bing take roughly one day to detect a change. In this case, Google is a little bit faster than the other two. The experimental test results show that the proposed WCD system is able to largely improve this performance. In this embodiment of the WCD system, the average time to detect a change is roughly one minute, which is three orders of magnitude smaller.

These results show that the method used by current search engines provides poor performance to detect web page changes, basically because the crawler must guess when the modification will occur. On the contrary, the WCD system relies on the web users accesses to collaboratively detect the changes on the web pages. The results obtained by the WCD system, even in the worst case scenario, show that web page changes can be detected almost in real time.

The invention claimed is:

1. A web change-detection server comprising: (a) a processor executing instructions to implement an agent manager comprising an agent management interface configured for receiving Web Change Detection (WCD) agent requests, wherein said agent manager is further configured for 1) sending a WCD agent to a client web browser depending on one or more local parameters and one or more remote parameters, and 2) processing said agent requests and using information stored in a WCD repository and information from said client web browser for determining a type of WCD agent to be sent, wherein said WCD agent is a web digester engine or a void agent configured to compute a web-page summary and send said web-page summary to said WCD server for monitoring, wherein said web digester engine computes said web-page summary by calculating a cryptographic hash on said web-page content to verify data integrity, and said cryptographic hash is a MD5 hash; (b) a processor executing instructions to implement a WCD detector configured for 1) receiving web page information sent by said WCD agent, 2) detecting modifications to said web page by retrieving WCD information stored on said WCD repository and comparing said WCD information stored on said WCD repository to said WCD information from said WCD agent, and 3) updating said web page information on said WCD repository; (c) a web traffic controller configured for allowing and disallowing access to said server by maintaining an index of security-based filtered IP addresses and URL addresses and a list of recent accesses for detecting distributed denial of service (DDoS); and (d) a memory storing said instructions to implement said agent manager and said WCD detector; wherein said server is configured to communicate with a search engine in a pull mode, push mode, or a combination thereof.

2. The web change-detection server of claim 1, wherein said WCD detector comprises a WCD data interface configured for receiving web page information sent by said WCD agents.

3. The web change-detection server of claim 2, wherein said server further comprises a load balancer.

4. The web change-detection server of claim 3, wherein said server is implemented using a distributed architecture.

* * * * *